(12) United States Patent
Klingemann et al.

(10) Patent No.: US 10,697,676 B2
(45) Date of Patent: Jun. 30, 2020

(54) ELECTRONIC EXPANSION DEVICE

(71) Applicant: TRANE INTERNATIONAL INC., Davidson, NC (US)

(72) Inventors: Steven K. Klingemann, West Salem, WI (US); Ryan Doud, Trempealeau, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 15/386,646

(22) Filed: Dec. 21, 2016

(65) Prior Publication Data
US 2017/0176068 A1 Jun. 22, 2017

Related U.S. Application Data

(60) Provisional application No. 62/270,569, filed on Dec. 21, 2015.

(51) Int. Cl.
*F25B 41/06* (2006.01)
*F16K 11/22* (2006.01)
(Continued)

(52) U.S. Cl.
CPC ............ *F25B 41/062* (2013.01); *F16K 11/22* (2013.01); *F16K 11/24* (2013.01); *F16K 27/029* (2013.01);
(Continued)

(58) Field of Classification Search
CPC ............ F25B 2341/0653; F25B 41/062; F16K 27/029; F16K 27/0263; F16K 47/08; F16K 11/22
(Continued)

(56) References Cited

U.S. PATENT DOCUMENTS 1,555,075 A * 9/1925 Pownall ................ F25B 41/062
137/15.01
3,090,423 A * 5/1963 Atterbury, Jr. ............ F23N 5/04
236/10
(Continued)

FOREIGN PATENT DOCUMENTS

CN 1985118 A 6/2007
CN 101614290 A 12/2009
(Continued)

OTHER PUBLICATIONS

Extended European Search Report, European Patent Application No. 16205380.5, dated Mar. 22, 2017 (9 pages).
(Continued)

*Primary Examiner* — Frantz F Jules
*Assistant Examiner* — Lionel Nouketcha
(74) *Attorney, Agent, or Firm* — Hamre, Schumann, Mueller and Larson, P.C.

(57) ABSTRACT

An electronic expansion device includes a main body having inlet and outlet side faces; an inlet disposed on the inlet side face; an orifice formed in the main body between the inlet side face and the outlet side face; a flow path fluidly connecting an inlet side of the orifice and an outlet side of the orifice, the flow path configured to redirect an inlet flow and provide an outlet flow; an outlet disposed on the outlet side face, the outlet being in fluid communication with the inlet via the orifice and the flow path; and a flow control device including an electric motor and a sealing member, the sealing member extending through the main body between the inlet and the outlet, wherein the sealing member is movable into and out of the main body to control the outlet flow of a fluid.

20 Claims, 7 Drawing Sheets

(51) Int. Cl.
  *F16K 11/24* (2006.01)
  *F16K 27/02* (2006.01)
  *F16K 47/08* (2006.01)
(52) U.S. Cl.
  CPC .......... *F16K 27/0263* (2013.01); *F16K 47/08* (2013.01); *F25B 2341/0653* (2013.01); *Y02B 30/72* (2013.01)
(58) Field of Classification Search
  USPC ...................... 251/120, 121, 122; 138/45, 46
  See application file for complete search history.

(56) References Cited

U.S. PATENT DOCUMENTS

| | | | | |
|---|---|---|---|---|
| 3,945,218 | A * | 3/1976 | Parker | F24F 5/00 |
| | | | | 165/45 |
| 4,928,494 | A | 5/1990 | Glamm | |
| 6,272,869 | B1 * | 8/2001 | Eber | F25B 41/062 |
| | | | | 62/197 |
| 7,828,012 | B2 * | 11/2010 | Hegberg | F16K 3/12 |
| | | | | 137/551 |
| 8,424,556 | B2 * | 4/2013 | Norlander | F24D 19/1015 |
| | | | | 137/240 |
| 2006/0005890 | A1 * | 1/2006 | Johnsen | F16K 1/10 |
| | | | | 137/630.15 |
| 2007/0163297 | A1 * | 7/2007 | Zhang | F25B 41/062 |
| | | | | 62/527 |
| 2015/0096629 | A1 * | 4/2015 | Barrila' | F16K 7/126 |
| | | | | 137/385 |
| 2016/0341336 | A1 * | 11/2016 | Harada | F25B 41/062 |

FOREIGN PATENT DOCUMENTS

| | | | |
|---|---|---|---|
| CN | 101680571 | A | 3/2010 |
| CN | 202274126 | U | 6/2012 |
| CN | 202520963 | | 11/2012 |
| CN | 204201181 | U * | 3/2015 |
| CN | 204201181 | U | 3/2015 |
| CN | 204693886 | U | 10/2015 |
| DE | 4238531 | A1 | 2/1994 |
| EP | 2725267 | | 4/2014 |
| WO | 2015007013 | | 1/2015 |

OTHER PUBLICATIONS

European Examination Report; European Patent Application No. 16205380.5, dated Apr. 13, 2018 (5 pages).

Chinese Office Action; Chinese Patent Application No. 2016111928605, Jun. 5, 2019, with partial English translation '11 pages).

Office Action; Chinese Patent Application No. 201611192860.5; Nov. 22, 2019, with partial English translation.

* cited by examiner

ELECTRONIC EXPANSION DEVICE

FIELD

This disclosure relates generally to heating, ventilation, air conditioning, and refrigeration (HVACR) systems. More specifically, the disclosure relates to an electronic expansion device for an HVACR system.

BACKGROUND

A heating, ventilation, air conditioning, and refrigeration (HVACR) system is generally used to control one or more environmental conditions such as, but not limited to, temperature and/or humidity of a space. In general, the HVACR system can include a heat transfer circuit that includes a compressor, a condenser, an expansion device, and an evaporator. The expansion device can control a flow of a heat transfer fluid in the heat transfer circuit. The expansion device can fail due to repeated use over time.

SUMMARY

This disclosure relates generally to heating, ventilation, air conditioning, and refrigeration (HVACR) systems. More specifically, the disclosure relates to an electronic expansion device for an HVACR system.

In an embodiment, the HVACR system can include a heat transfer circuit configured to heat or cool a heat transfer fluid or medium (e.g., a liquid such as, but not limited to, water or the like), in which case the heat transfer circuit, in an embodiment, may be generally representative of a liquid chiller system.

In an embodiment, the electronic expansion device can be retrofitted into an existing HVACR system.

In an embodiment, the electronic expansion device can be retrofitted into an HVACR system having a capacity between at or about 130 tons and at or about 1,000 tons. In an embodiment, the electronic expansion device can be retrofitted into an HVACR system having a capacity between at or about 130 tons and at or about 450 tons.

In an embodiment, the electronic expansion device can be manufactured by a three-dimensional (3D) printing process. In an embodiment, the electronic expansion device can be manufactured by a casting process. In an embodiment, the electronic expansion device can be manufactured by a milling and/or turning process.

In an embodiment the electronic expansion device can be included in a new installation of an HVACR system.

In an embodiment, the electronic expansion device can include a main body. The main body can include an inlet side face and an outlet side face and an orifice between the inlet and outlet side faces, the orifice having an inlet side and an outlet side in fluid communication with the inlet side of the orifice. A flow path can connect the inlet and outlet sides of the orifice such that a flow received at the inlet side is redirected and provided to the outlet side. One or more flow control devices can be disposed extending through a face of the main body. The flow control devices can include an electric motor and a sealing member. An inlet flow direction and an outlet flow direction may be substantially similar or the same. In an embodiment, the sealing member may require a fluid flow path to turn 90° relative to the inlet flow direction. In an embodiment, the sealing member may require a fluid flow path that is at an angle other than 90° relative to the inlet flow direction. A flow path enabling flow between an inlet side and an outlet side of the orifice can be formed in the main body.

In an embodiment, the main body can be cylindrical. In such an embodiment, the flow control devices may be disposed extending through a curved face of the main body. The flow control devices may, for example, extend radially from the curved face of the main body.

An electronic expansion device is disclosed. The electronic expansion device includes a main body having an inlet side face and an outlet side face; an inlet disposed on the inlet side face; an orifice formed in the main body between the inlet side face and the outlet side face; a flow path fluidly connecting an inlet side of the orifice and an outlet side of the orifice, the flow path configured to redirect an inlet flow and provide an outlet flow; an outlet disposed on the outlet side face, the outlet being in fluid communication with the inlet via the orifice and the flow path; and a flow control device including an electric motor and a sealing member, the sealing member extending through the main body between the inlet and the outlet, wherein the sealing member is movable into and out of the main body to control the outlet flow of a fluid.

An HVACR system is also disclosed. The HVACR system includes a heat transfer circuit, including a compressor, a condenser, an electronic expansion device, and an evaporator. The electronic expansion device includes a main body having an inlet side face and an outlet side face; an inlet disposed on the inlet side face; an orifice formed in the main body between the inlet side face and the outlet side face; a flow path fluidly connecting an inlet side of the orifice and an outlet side of the orifice, the flow path configured to redirect an inlet flow and provide an outlet flow; an outlet disposed on the outlet side face, the outlet being in fluid communication with the inlet via the orifice and the flow path; and a flow control device including an electric motor and a sealing member, the sealing member extending through the main body between the inlet and the outlet, wherein the sealing member is movable into and out of the main body to control the outlet flow of a fluid.

An electronic expansion device for directing flow of a heat transfer fluid in a heat transfer circuit is also disclosed. The electronic expansion device includes a main body having an inlet side face and an outlet side face; an inlet disposed on the inlet side face, the inlet being fluidly communicable with a condenser in a heat transfer circuit; an outlet disposed on the outlet side face, the outlet being fluidly communicable with an evaporator in the heat transfer circuit; an orifice formed in the main body between the inlet side face and the outlet side face; a flow path fluidly connecting an inlet side of the orifice and an outlet side of the orifice, the flow path configured to redirect an inlet flow and provide an outlet flow; an electric motor; and a sealing member, wherein the sealing member extends through the main body between the inlet and the outlet, and wherein the sealing member is movable into and out of the orifice to control a flow of a heat transfer fluid from the condenser to the evaporator.

A method of retrofitting an electronic expansion device into an HVACR system is also disclosed. The method includes removing an expansion device from the HVACR system; and installing the electronic expansion device in place of the removed expansion device, wherein the electronic expansion device includes a main body having an inlet side face and an outlet side face, an inlet disposed on the inlet side face, an orifice formed in the main body between the inlet side face and the outlet side face, a flow path fluidly connecting an inlet side of the orifice and an outlet side of the orifice, the flow path configured to redirect an inlet flow and provide an outlet flow, an outlet disposed on the outlet side face, the outlet being in fluid communication with the inlet via the orifice and the flow path, and a flow control device including an electric motor and a sealing member, the sealing member extending through the main body between the inlet and the outlet, wherein the sealing member is movable into and out of the main body to control the outlet flow of a fluid.

A method of fluid flow in a heat transfer circuit is also disclosed. The method includes receiving, at an inlet of an electronic expansion device, a heat transfer fluid from a first heat exchanger; redirecting the heat transfer fluid in a main body of the electronic expansion device; and providing the heat transfer fluid to a second heat exchanger from an outlet of the electronic expansion device, wherein an inlet flow direction and an outlet flow direction of the heat transfer fluid are the same.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to heating, ventilation, air conditioning, and refrigeration (HVACR) systems. More specifically, the disclosure relates to an electronic expansion device for an HVACR system.

HVACR systems such as, liquid chiller systems, generally include a heat transfer circuit that includes, among other features, an expansion device. In an embodiment, the expansion device can be an electronic expansion device. The expansion device can be a point of failure in the HVACR system. Accordingly, the expansion device may need to be replaced. In an embodiment, the expansion device from an existing HVACR system may not be the same as expansion devices currently available on the market. As a result, retrofitting an expansion device into an existing HVACR system can require modifications to the piping which carries heat transfer fluid (e.g., refrigerant) through the HVACR system. This can be a costly and time-consuming endeavor.

Embodiments described in this specification are directed to providing an electronic expansion device which can be retrofit into an existing HVACR system without significantly modifying the HVACR system (e.g., piping, etc.). For example, in an HVACR system in which an electronic expansion device is to be replaced, a newer or different style electronic expansion device may be available, but an identical electronic expansion device to the device being replaced may not be available. The newer or different style device can, for example, be designed for a different fluid flow relationship than the device to be replaced. In an embodiment, the electronic expansion device described herein can be used as a replacement in which space is limited and without, for example, rerouting pipes carrying the heat transfer fluid to and from the electronic expansion device. This can, for example, reduce an amount of effort and cost to replace the electronic expansion device. In an embodiment, the electronic expansion device can be included in a new installation of an HVACR system (e.g., not retrofit into an existing HVACR system).

Figure 1:
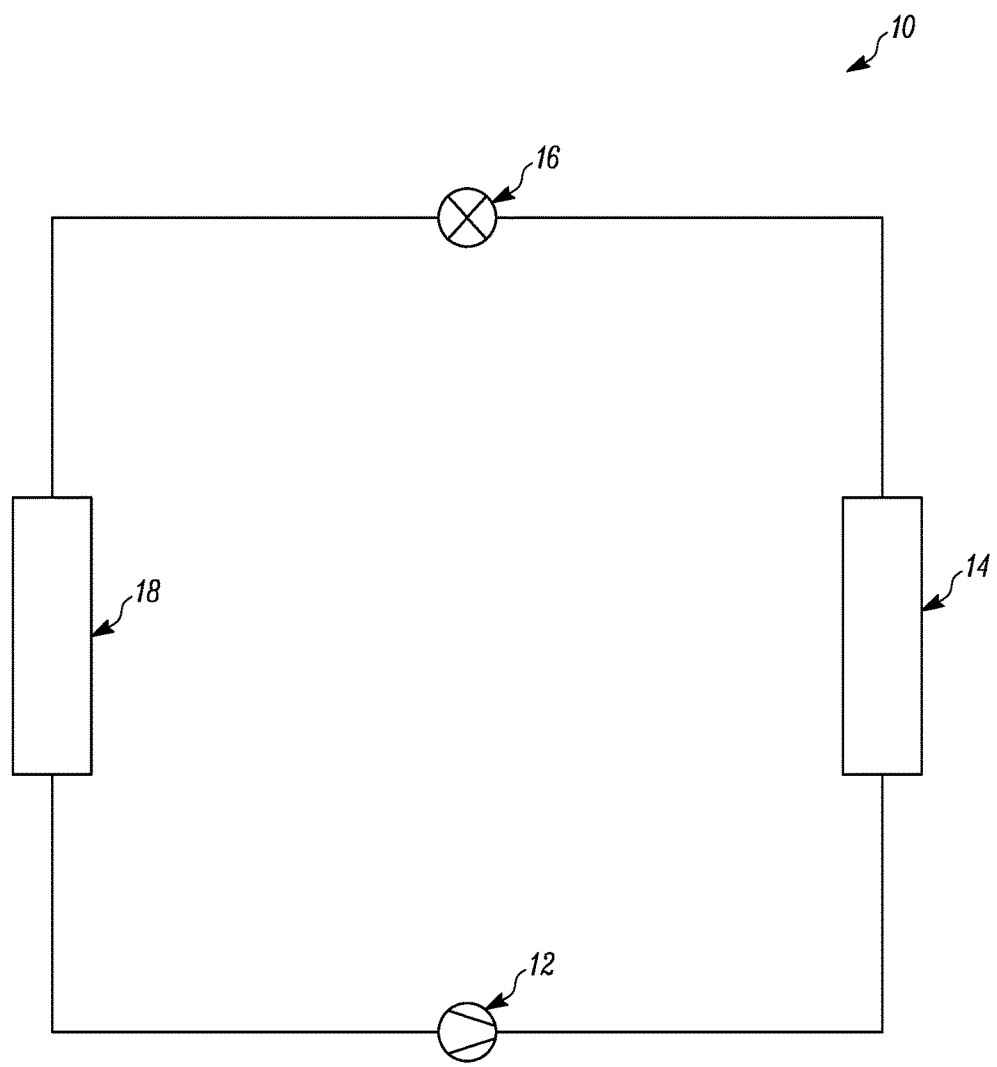
FIG. 1 is a schematic diagram of a heat transfer circuit, according to an embodiment.

FIG. 1 is a schematic diagram of a heat transfer circuit 10, according to an embodiment. The heat transfer circuit 10 generally includes a compressor 12, a condenser 14, an electronic expansion device 16, and an evaporator 18. The heat transfer circuit 10 is exemplary and can be modified to include additional components. For example, in an embodiment the heat transfer circuit 10 can include an economizer heat exchanger, one or more flow control devices, a receiver tank, a dryer, a suction-liquid heat exchanger, or the like. In an embodiment, the heat transfer circuit 10 can include a plurality of compressors 12. In an embodiment, the plurality of compressors 12 can include compressors having different capacities.

The heat transfer circuit 10 can generally be applied in a variety of systems used to control an environmental condition (e.g., temperature, humidity, air quality, or the like) in a space (generally referred to as a conditioned space). Examples of systems include, but are not limited to, HVACR systems, transport refrigeration systems, or the like.

The components of the heat transfer circuit 10 are fluidly connected. The heat transfer circuit 10 can be specifically configured to be a cooling system (e.g., an air conditioning system) capable of operating in a cooling mode. Alternatively, the heat transfer circuit 10 can be specifically configured to be a heat pump system which can operate in both a cooling mode and a heating/defrost mode.

Heat transfer circuit 10 operates according to generally known principles. The heat transfer circuit 10 can be configured to heat or cool a heat transfer fluid or medium (e.g., a liquid such as, but not limited to, water or the like), in which case the heat transfer circuit 10, in an embodiment, may be generally representative of a liquid chiller system. The heat transfer circuit 10 can alternatively be configured to heat or cool a heat transfer medium or fluid (e.g., a gas such as, but not limited to, air or the like), in which case the heat transfer circuit 10 may be generally representative of an air conditioner or heat pump. In an embodiment, the air conditioner or heat pump can be included, for example, in a rooftop HVACR unit or the like.

In operation, the compressor 12 compresses a heat transfer fluid (e.g., refrigerant or the like) from a relatively lower pressure gas to a relatively higher-pressure gas. The relatively higher-pressure gas is discharged from the compressor 12 and flows through the condenser 14. In accordance with generally known principles, the heat transfer fluid flows through the condenser 14 and rejects heat to a heat transfer fluid or medium (e.g., water, air, etc.), thereby cooling the heat transfer fluid. The cooled heat transfer fluid, which is now in a liquid form, flows to the electronic expansion device 16. The electronic expansion device 16 reduces the pressure of the heat transfer fluid. As a result, a portion of the heat transfer fluid is converted to a gaseous form. The heat transfer fluid, which is now in a mixed liquid and gaseous form flows to the evaporator 18. The heat transfer fluid flows through the evaporator 18 and absorbs heat from a heat transfer medium (e.g., water, air, etc.), heating the heat transfer fluid, and converting it to a gaseous form. The gaseous heat transfer fluid then returns to the compressor 12. The above-described process continues while the heat transfer circuit is operating, for example, in a cooling mode (e.g., while the compressor 12 is enabled).

FIGS. 2-6 illustrate various views of the electronic expansion device 16, according to an embodiment.

Figure 2:
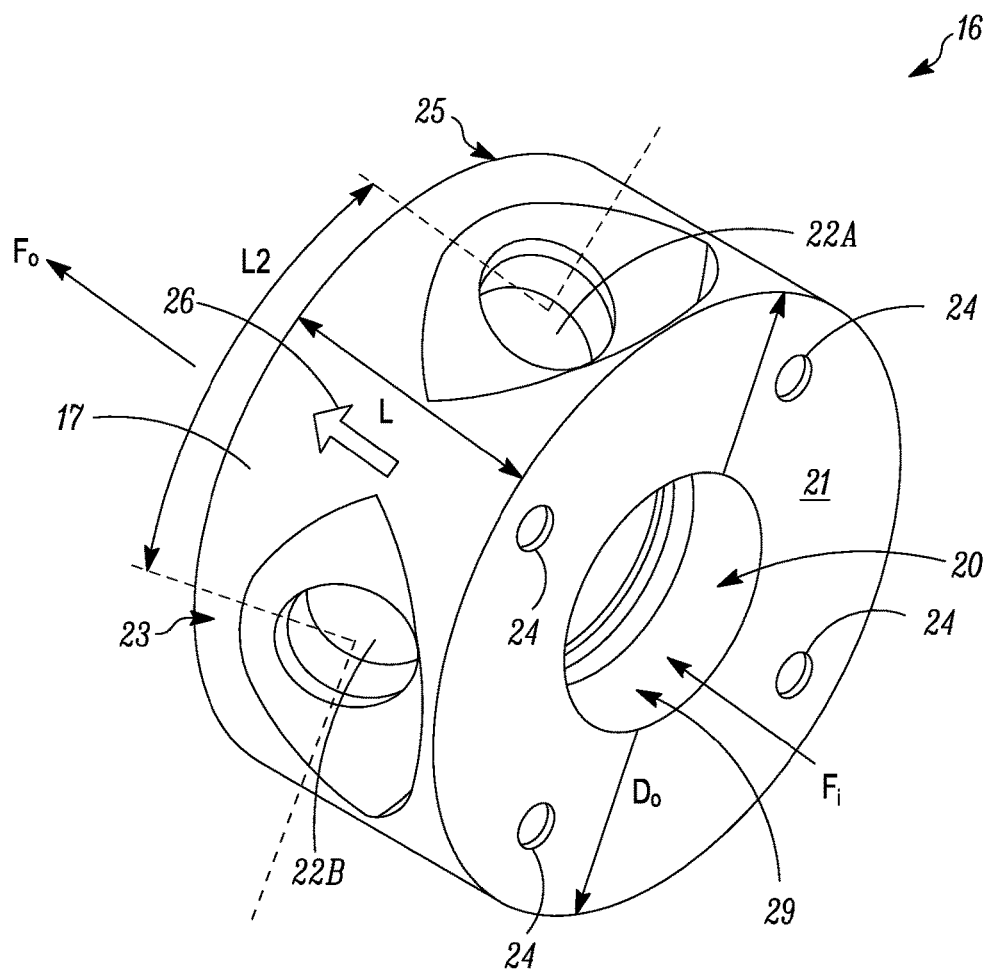
FIGS. 2-6 illustrate various views of an electronic expansion device, according to an embodiment.

FIG. 2 illustrates the electronic expansion device 16, according to an embodiment. The electronic expansion device 16 includes a main body 17. The main body 17 includes an inlet 20, valve mounts 22A, 22B, mounting apertures 24, and an optional flow indicator 26. For the simplicity of this specification, the valve mounts 22A, 22B will generally be referred to as the valve mounts 22 unless specifically referred to otherwise. The electronic expansion device also includes flow control devices 40 (shown and described in accordance with FIGS. 5-7 below).

The main body 17 can be manufactured in a variety of manners. For example, in an embodiment, the main body 17 can be manufactured by a casting process or a milling and/or turning process. In an embodiment, the main body 17 can be a three-dimensional (3D) printed component. It will be appreciated that these manufacturing methods are examples, and that other processes for manufacturing the main body 17 can be used within the scope of this disclosure. The main body 17 is illustrated as being cylindrical. It will be appreciated that the geometry of the main body 17 is an example, and that other geometries for the main body 17 can function according to the principles described in this specification.

Figure 5:
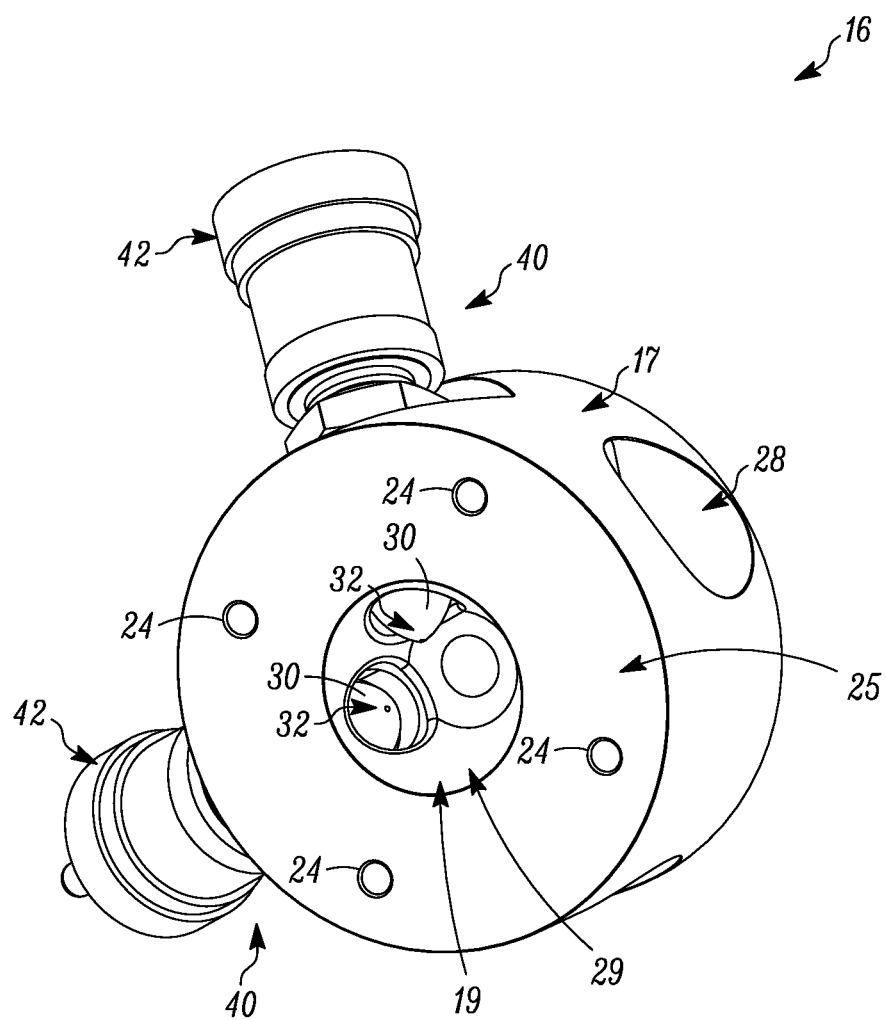

The inlet 20 is disposed on an inlet side face 21 of the main body 17. An outlet 19 (FIG. 5) is disposed on an outlet side face 25 (FIG. 5). The outlet 19 is disposed at an opposite face of the main body 17 from the inlet side face 21. The main body 17 includes an orifice 29 having a portion on an inlet side and a portion on an outlet side of the main body. The orifice 29 can be shaped, for example, such that flow is directed toward one or more flow paths (e.g., flow path 31 in FIGS. 6-7) which connect the inlet side and the outlet side of the orifice 29. For example, in an embodiment, the orifice 29 can be spherical on the inlet side of the orifice 29 and spherical on the outlet side of the orifice 29. The orifice 29 does not extend entirely through the main body in a direction of flow. That is, a depth of the orifice 29 on the inlet side is less than a length L of the main body 17 in a direction of inlet flow $F_i$. The inlet 20 generally includes an aperture in the main body 17. The inlet flow $F_i$ enters the inlet 20 and is provided to the outlet 19 via the one or more flow paths and the outlet side of the orifice 29. In an embodiment, the length L may be selected based on one or more space constraints of an HVACR system in which the electronic expansion device 16 is to be installed. In an embodiment, the length L of the main body 17 can be between at or about 3 inches and at or about 8 inches. In an embodiment, the length L of the main body 17 can be between at or about 3 inches and at or about 4 inches. It will be appreciated that the length L of the main body 17 can vary beyond the stated range. For example, if a particular HVACR system includes sufficient space to accommodate an electronic expansion device 16 having a length of 5 inches, the length L could be larger. In such an embodiment, the length L could alternatively be maintained and a spacer (e.g., an additional length of piping, etc.) included accounting for the additional spacing.

In the illustrated embodiment, two valve mounts 22A, 22B are shown. It will be appreciated that the number of valve mounts 22 can vary. In an embodiment, the number of valve mounts 22 can be selected depending on a particular application for the electronic expansion device 16. For example, in an embodiment, the number of valve mounts 22 can be dependent upon a design of an HVACR system including a heat transfer circuit (e.g., heat transfer circuit 10 of FIG. 1) in which the electronic expansion device 16 is to be used. In an embodiment, the number of valve mounts 22 may be based on a capacity of the HVACR system. Each flow control device (e.g., flow control device 40 of FIGS. 5-7 below) installed in a corresponding valve mount 22 has a particular capacity. For example, in an embodiment, the flow control device can have a capacity of 250 tons. It will be appreciated that this capacity is an example, and that the actual capacity of the flow control device can vary beyond the stated value. Thus, the number of valve mounts 22 (and correspondingly the number of flow control devices having a particular capacity) can be selected to vary the capacity of the electronic expansion device 16 between at or about 130 tons and at or about 1,000 tons. In an embodiment, the number of valve mounts 22 can be selected to vary the capacity of the electronic expansion device 16 between at or about 130 tons and at or about 450 tons. It will be appreciated that the capacities are intended to be examples and that the capacity can vary beyond the stated ranges.

Figure 6:
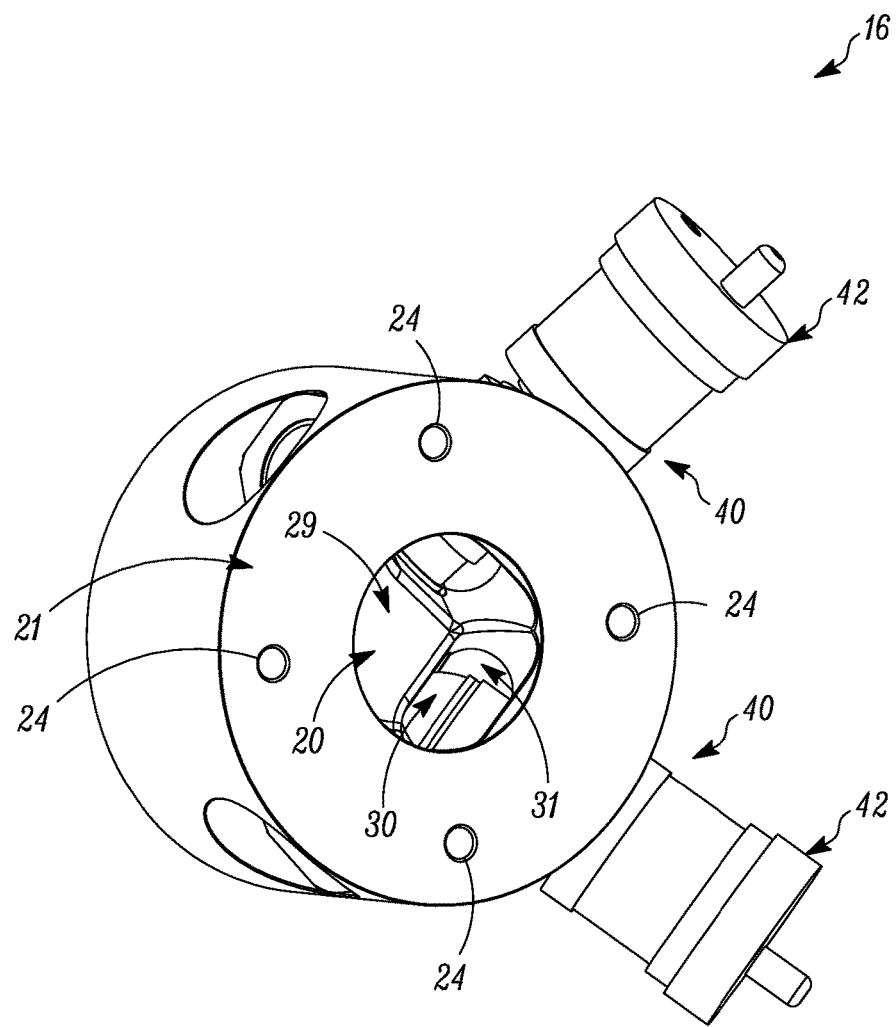
Figure 7:
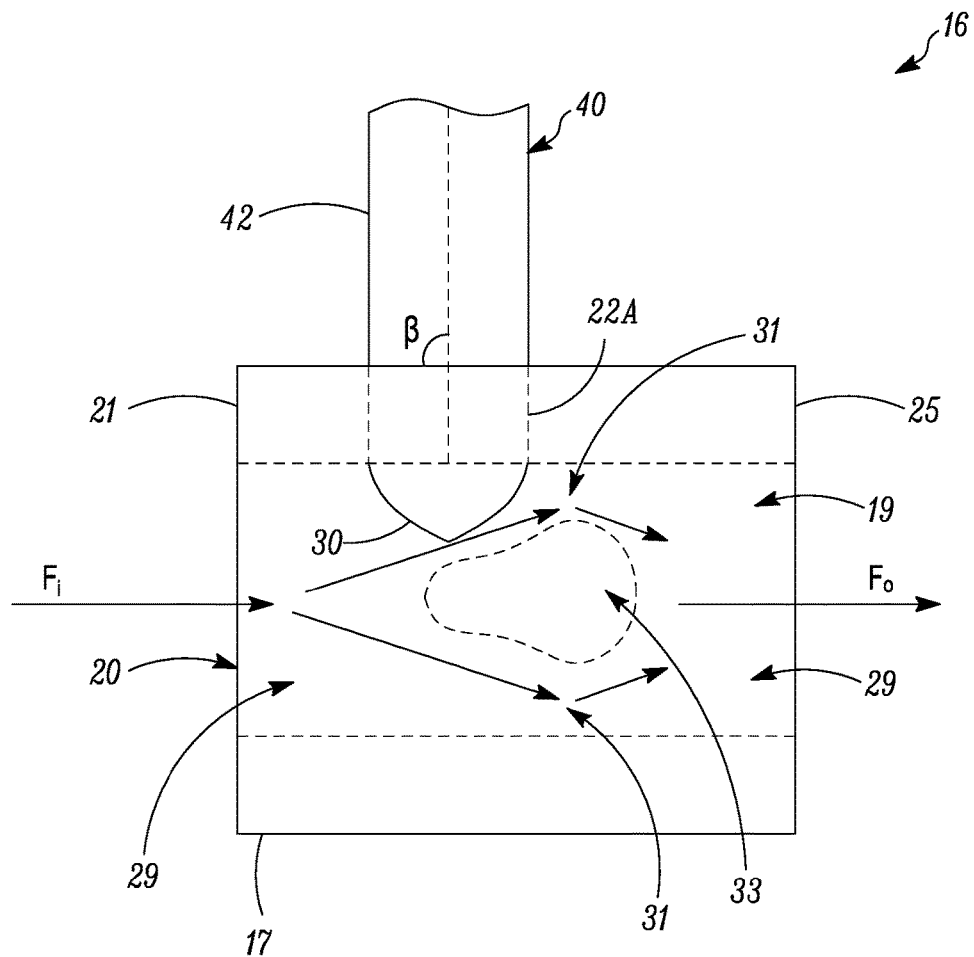
FIG. 7 is a schematic diagram of an electronic expansion device, according to an embodiment.

The valve mounts 22A and 22B can be the same in an embodiment. This can, for example, increase the simplicity of manufacturing the main body 17. In an embodiment, each of the valve mounts 22 can be designed to accept a similar flow control device 40 (FIGS. 5-7). Accordingly, the capacity of the electronic expansion device 16 can be varied by modifying the number of valve mounts 22, according to an embodiment. In an embodiment, the valve mounts 22A and 22B can be different from each other. In such an embodiment, the valve mounts 22A, 22B can be designed to accept a particular flow control device 40 (FIGS. 5-7). In such an embodiment, the capacity of the electronic expansion device 16 can be based on the flow control devices 40 (FIGS. 5-7) that are selected.

The valve mounts 22 can also be placed in various locations along the circumference of the main body 17. For example, a circumferential distance L2 between a center of the valve mount 22A and a center of the valve mount 22B can be varied. The distance L2 can, for example, be based on a particular flow control device 40 (FIG. 6) being used with the electronic expansion device 16, and/or one or more space constraints based on an application for the electronic expansion device 16.

The mounting apertures 24 are generally configured to be used to secure the electronic expansion device 16 in place in an HVACR system. In an embodiment, the inlet side face 21 includes the plurality of mounting apertures 24. The outlet side face 25 (FIG. 6) can also include the plurality of mounting apertures 24. The mounting apertures 24 can be configured to, for example, receive a plurality of bolts (not shown). It will be appreciated that the number of mounting apertures 24 is intended to be an example, and that the number of mounting apertures 24 can vary beyond the illustrated four mounting apertures 24.

In the illustrated embodiment, the electronic expansion device 16 includes a flow indicator 26. It will be appreciated that the flow indicator 26 is optional. In an embodiment, the flow indicator 26 can, for example, provide a technician installing the electronic expansion device 16 with an indication of the orientation in which the electronic expansion device 16 should be installed. The flow indicator 26 points in the inlet flow direction $F_i$ toward the outlet flow direction $F_o$. The outlet flow direction $F_o$ is substantially similar to or the same as the inlet flow direction $F_i$. It will be appreciated that the particular design of the flow indicator 26 is not intended to be limiting and that other designs may be possible within the scope of the description herein. For example, the flow indicator 16 can be an image or symbol (e.g., an arrow as illustrated in FIG. 2), the flow indicator 16 can be text, or the flow indicator can be suitable combinations thereof.

Figure 3:
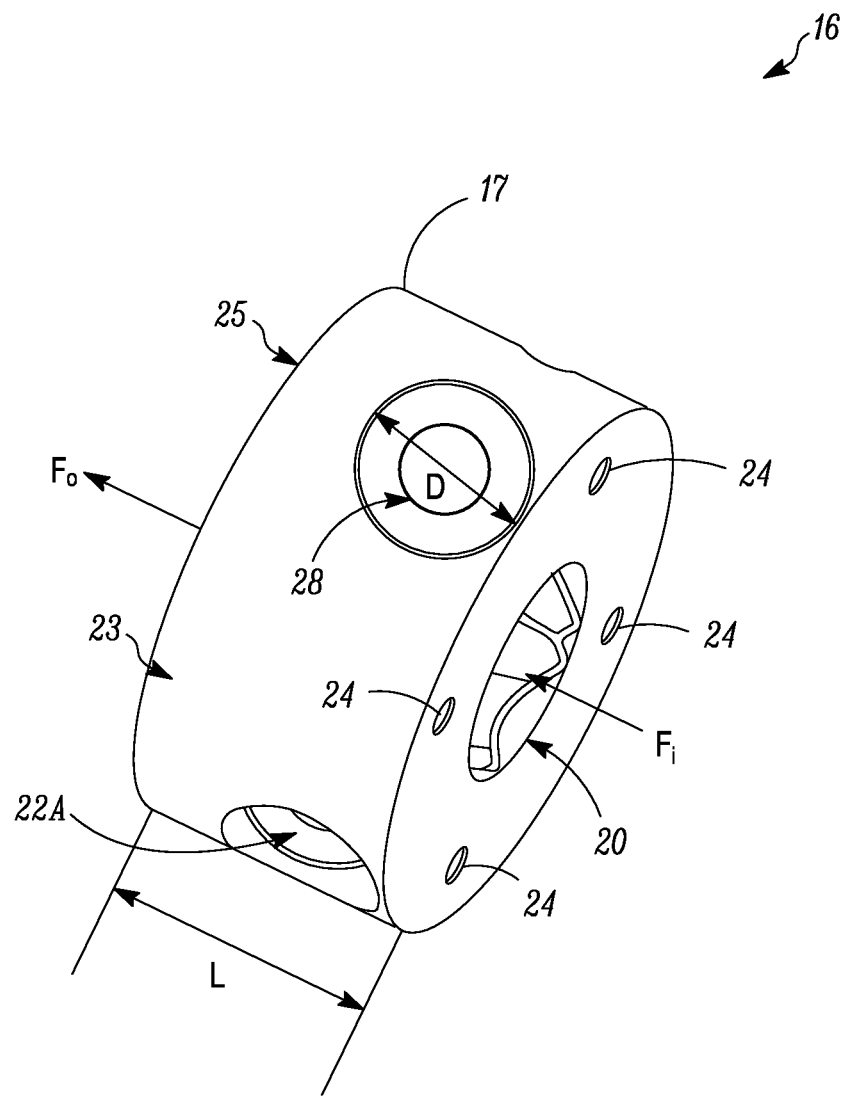

FIG. 3 illustrates the electronic expansion device 16, according to an embodiment. The electronic expansion device 16 can further include a site glass 28. The site glass 28 may be optional. For example, in an embodiment, the number of valve mounts 22 may be increased to provide a higher capacity for the electronic expansion device 16. In such an embodiment, the site glass 28 can be removed in order to accommodate the additional space taken up by the valve mounts 22. The site glass 28 can, for example, provide a technician the ability to view a position of the flow control device within the valve mounts 22. This can, for example, enable a technician to troubleshoot and determine whether the flow control devices are working correctly. The site glass 28 generally has a diameter D. It will be appreciated that the diameter D can be varied within the length L of the main body 17.

Figure 4:
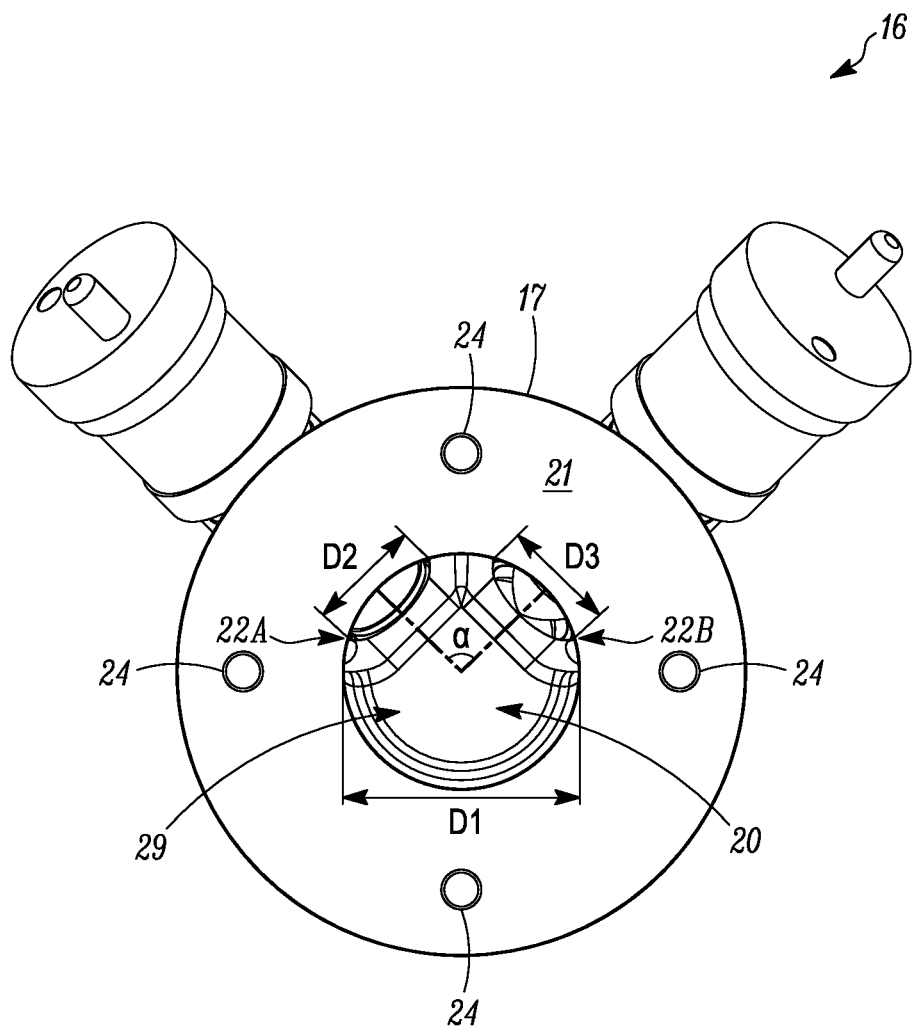

FIG. 4 illustrates the electronic expansion device 16, according to an embodiment. In the illustrated embodiment, the inlet 20 and the inlet side of the orifice 29 are shown in further detail. In the figure, the inlet flow $F_i$ (not illustrated) and the outlet flow $F_o$ (not illustrated) would be oriented into the page. The valve mounts 22A, 22B are shown. The inlet 20 has a diameter D1 which is relatively smaller than a diameter D0 (FIG. 2) of the main body 17 of the electronic expansion device 16. In an embodiment, the diameter D1 may be based on, for example, piping with which the electronic expansion device 16 will be connected in an HVACR system. The valve mount 22A has a diameter D2 and the valve mount 22B has a diameter D3. In an embodiment, the diameters D2 and D3 can be the same or substantially the same. The valve mounts 22A, 22B are disposed at an angle relative to each other. The angle α is shown between longitudinal axes A1 and A2 of the valve mounts 22A, 22B. In an embodiment, the angle α can be at or about 90°. It will be appreciated that the angle α can vary. In an embodiment, the angle α can be based on, for example, one or more space constraints of the HVACR system with which the electronic expansion device 16 is to be used, an orientation of the flow control device 40 (FIGS. 5-6), or the like.

FIG. 5 illustrates the electronic expansion device 16, according to an embodiment. FIG. 5 illustrates the outlet side face 25 of the electronic expansion device 16. In the illustrated embodiment, the electronic expansion device 16 includes a plurality of sealing members 30 installed in the valve mounts 22. In the illustrated embodiment, the sealing members 30 extend through the valve mounts 22 and into the orifice 29 of the outlet 19. The sealing members 30 are conical in the illustrated embodiment. The geometry of the sealing members 30 can be varied. In operation, a location of the sealing members 30 within the valve mounts 22 can be varied in order to control a flow of the fluid (e.g., heat transfer fluid) through the electronic expansion device 16. For example, the sealing members 30 can move relatively farther radially into the main body 17 in order to reduce the flow, and can move relatively farther radially outward from the main body 17 in order to increase the flow. The sealing members 30 can be moved by an electronic motor (e.g., electronic motor 42 of FIGS. 5 and 6). In the figure, the outlet flow $F_o$ (not illustrated) and the inlet flow $F_i$ (not illustrated) would be oriented out of the page.

In FIG. 5, the illustrated sealing members 30 include an aperture 32. The aperture 32 may be optional, according to an embodiment. A single aperture 32 is illustrated in FIG. 5. It will be appreciated that a different number of apertures 32 may be included. Generally, the apertures 32 may provide a pressure relief path when, for example, the flow is in a blocked state or a partially blocked state.

FIG. 6 illustrates the electronic expansion device 16, according to an embodiment. FIG. 6 illustrates the inlet side face 21 of the electronic expansion device 16. The inlet side face 21 includes the inlet 20. As described above, the inlet 20 is in fluid communication with the outlet 19. In the figure, the inlet flow $F_i$ (not illustrated) and the outlet flow $F_o$ (not illustrated) would be oriented into the page.

FIG. 7 is a schematic diagram of the electronic expansion device 16, according to an embodiment. The schematic shows a flow control device 40 installed at valve mount 22A of the electronic expansion device 16.

The flow control device 40 includes an electric motor 42 and a sealing member 30. The sealing member 30 can be disposed in the inlet 20 of the electronic expansion device 16. The flow control device 40 generally can move the sealing member 30 into and out of the valve mount 22A in order to increase or reduce fluid flow (e.g., vertically up or vertically down with respect to the page in FIG. 7). A longitudinal axis of the valve mount 22A can be disposed at an angle B with respect to a circumferential surface 23 (FIGS. 1-2) of the electronic expansion device 16. In an embodiment, the angle B can generally be less than about 90°. The angle B can be determined, for example, by one or more space constraints of the HVACR system in which the electronic expansion device 16 is to be installed. For example, a relatively smaller angle B can provide for a design that requires relatively less space than a relatively larger angle B.

As can be seen in FIG. 7, the inlet side of the orifice 29 and the outlet side of the orifice 29 are fluidly connected via the flow paths 31. It will be appreciated that the particular geometry of the orifice 29 and the flow paths 31 is an example. Generally, the flow direction is from left to right with respect to the page. The inflow is in the inlet direction $F_i$ and is forced to flow around a flow director 33. The flow director 33 can, for example, be a piece of material that is part of the main body 17. The flow director 33 and the main body 17 can form the flow paths 31. For example, the flow director 33 can be a remaining piece of material if the orifice 29 and flow paths 31 are, for example, machined or cast as part of the main body 17. The flow path 31 can be, for example, curved such that flow is received in a first direction $(F_i)$, is redirected in a second direction that is different from the first direction and a third direction, and is provided in the third direction $(F_o)$.

Aspects:

It is noted that any one of aspects 1-10 below can be combined with any one of aspects 11-20, 21-25, 26, and 27. Any one of aspects 11-20 can be combined with any one of aspects 21-25, 26, and 27. Any one of aspects 21-25 can be combined with any one of aspects 26 or 27. Aspect 26 can be combined with aspect 27.

Aspect 1. An electronic expansion device, comprising:
a main body having an inlet side face and an outlet side face;
an inlet disposed on the inlet side face;
an orifice formed in the main body between the inlet side face and the outlet side face and having an inlet side and an outlet side;
a flow path from the inlet side of the orifice to the outlet side of the orifice, the flow path configured to redirect an inlet flow and provide an outlet flow;

an outlet disposed on the outlet side face, the outlet being in fluid communication with the inlet via the orifice and the flow path; and a flow control device including an electric motor and a sealing member, the sealing member extending through the main body between the inlet and the outlet, wherein the sealing member is movable into and out of the main body to control the outlet flow of a fluid.

Aspect 2. The electronic expansion device according to aspect 1, wherein the main body is cylindrical and the inlet side face is a circular plane surface of the cylindrical main body and the outlet side face is a circular plane surface of the cylindrical main body.

Aspect 3. The electronic expansion device according to aspect 2, wherein the flow control device extends through a curved surface of the main body.

Aspect 4. The electronic expansion device according to any one of aspects 1-3, further comprising a plurality of flow control devices.

Aspect 5. The electronic expansion device according to any one of aspects 1-4, wherein the electronic expansion device has a capacity between about 130 tons and about 1,000 tons.

Aspect 6. The electronic expansion device according to aspect 5, wherein the electronic expansion device has a capacity between about 130 tons and about 450 tons.

Aspect 7. The electronic expansion device according to any one of aspects 1-6, further comprising a site glass.

Aspect 8. The electronic expansion device according to any one of aspects 1-7, further comprising a flow indicator.

Aspect 9. The electronic expansion device according to any one of aspects 1-8, wherein the flow path is curved.

Aspect 10. The electronic expansion device according to any one of aspects 1-9, wherein the flow path is formed by a flow director.

Aspect 11. A heating, ventilation, air conditioning, and refrigeration (HVACR) system, comprising:
a heat transfer circuit, including:
a compressor, a condenser, an electronic expansion device, and an evaporator,
wherein the electronic expansion device includes:
a main body having an inlet side face and an outlet side face;
an inlet disposed on the inlet side face;
an orifice formed in the main body between the inlet side face and the outlet side face and having an inlet side and an outlet side;
a flow path from the inlet side of the orifice to the outlet side of the orifice, the flow path configured to redirect an inlet flow and provide an outlet flow;
an outlet disposed on the outlet side face, the outlet being in fluid communication with the inlet via the orifice and the flow path; and
a flow control device including an electric motor and a sealing member, the sealing member extending through the main body between the inlet and the outlet, wherein the sealing member is movable into and out of the main body to control the outlet flow of a fluid.

Aspect 12. The HVACR system according to aspect 11, wherein the main body is cylindrical and the inlet side face is a circular plane surface of the cylindrical main body and the outlet side face is a circular plane surface of the cylindrical main body.

Aspect 13. The HVACR system according to aspect 12, wherein the flow control device extends through a curved surface of the main body.

Aspect 14. The HVACR system according to any one of aspects 11-13, further comprising a plurality of flow control devices.

Aspect 15. The HVACR system according to any one of aspects 11-14, wherein the electronic expansion device has a capacity between about 130 tons and about 1,000 tons.

Aspect 16. The HVACR system according to aspect 15, wherein the electronic expansion device has a capacity between about 130 tons and about 450 tons.

Aspect 17. The HVACR system according to any one of aspects 11-16, further comprising a site glass.

Aspect 18. The HVACR system according to any one of aspects 11-17, further comprising a flow indicator.

Aspect 19. The HVACR system according to any one of aspects 11-18, wherein the flow path is curved.

Aspect 20. The electronic expansion device according to any one of aspects 11-19, wherein the flow path is formed by a flow director.

Aspect 21. An electronic expansion device for directing flow of a heat transfer fluid in a heat transfer circuit, the electronic expansion device comprising:
a main body having an inlet side face and an outlet side face;
an inlet disposed on the inlet side face, the inlet being fluidly communicable with a condenser in a heat transfer circuit;
an outlet disposed on the outlet side face, the outlet being fluidly communicable with an evaporator in the heat transfer circuit;
an orifice formed in the main body between the inlet side face and the outlet side face and having an inlet side and an outlet side;
a flow path from the inlet side of the orifice to the outlet side of the orifice, the flow path configured to redirect an inlet flow and provide an outlet flow;
an electric motor; and
a sealing member, wherein the sealing member extends through the main body between the inlet and the outlet, and wherein the sealing member is movable into and out of the orifice to control a flow of a heat transfer fluid from the condenser to the evaporator.

Aspect 22. The electronic expansion device according to aspect 21, wherein the inlet side face is securable to piping configured to provide the heat transfer fluid from the condenser to the inlet.

Aspect 23. The electronic expansion device according to any one of aspects 21-22, further comprising a site glass.

Aspect 24. The electronic expansion device according to any one of aspects 21-23, wherein the flow path is curved.

Aspect 25. The electronic expansion device according to any one of aspects 21-24, wherein the flow path is formed by a flow director.

Aspect 26. A method of retrofitting an electronic expansion device into a heating, ventilation, air conditioning, and refrigeration (HVACR) system, the method comprising:
removing an expansion device from the HVACR system; and
installing the electronic expansion device in place of the removed expansion device, wherein the electronic expansion device includes a main body having an inlet side face and an outlet side face, an inlet disposed on the inlet side face, an orifice formed in the main body between the inlet side face and the outlet side face and having an inlet side and an outlet side, a flow path from the inlet side of the orifice to the outlet side of the orifice, the flow path configured to redirect an inlet flow and provide an outlet flow, an outlet disposed on the outlet side face, the outlet being in fluid communication with the inlet via the orifice and the flow path, and a flow control device including an electric motor and a sealing member, the sealing member extending through the main body between the inlet and the outlet, wherein the sealing member is movable into and out of the main body to control the outlet flow of a fluid.

Aspect 27. A method of fluid flow in a heat transfer circuit, comprising:
receiving, at an inlet of an electronic expansion device, a heat transfer fluid from a first heat exchanger;
redirecting the heat transfer fluid in a main body of the electronic expansion device; and providing the heat transfer fluid to a second heat exchanger from an outlet of the electronic expansion device, wherein an inlet flow direction and an outlet flow direction of the heat transfer fluid are the same.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An electronic expansion device, comprising:
a main body having an inlet side face and an outlet side face;
an inlet disposed on the inlet side face;
an orifice formed in the main body between the inlet side face and the outlet side face, the orifice having an inlet side and an outlet side;
a flow path extending from the inlet side of the orifice to the outlet side of the orifice, the flow path configured to redirect an inlet flow and provide an outlet flow;
an outlet disposed on the outlet side face, the outlet being in fluid communication with the inlet via the orifice and the flow path, wherein the flow path is configured to receive the inlet flow from the inlet, the inlet flow is divided into a plurality of flow paths around a flow director, and the flow path is rejoined downstream of the flow director to provide the outlet flow from the outlet;
a plurality of flow control devices each including an electric motor and a sealing member, each sealing member extending through the main body between the inlet and the outlet, wherein each sealing member is movable into and out of the main body to control the outlet flow of a fluid, each sealing member being movable toward the flow director to reduce the outlet flow and movable away from the flow director to increase the outlet flow, each sealing member is spaced from the flow director to allow the flow path around a periphery of the flow director, the flow path is configured to redirect the inlet flow away from a longitudinal direction along a space between each sealing member and the flow director, and then converge the inlet flow to provide the outlet flow in the longitudinal direction; and
a plurality of flow control device mounts in the main body that are spaced circumferentially around the orifice such that a distance between the plurality of flow control device mounts corresponds to an arc length between the plurality of flow control device mounts, each flow control device mount of the plurality of flow control device mounts having a longitudinal axis, each longitudinal axis being arranged at an angle relative to the other longitudinal axes along a respective radius of the orifice, the plurality of flow control device mounts configured to receive the plurality of flow control devices.

2. The electronic expansion device according to claim 1, wherein the inlet side face is a circular plane surface of the main body and the outlet side face is a circular plane surface of the main body.

3. The electronic expansion device according to claim 2, wherein the plurality of flow control devices extend through a curved surface of the main body.

4. The electronic expansion device according to claim 1, wherein the electronic expansion device has a capacity between about 130 tons and about 1,000 tons.

5. The electronic expansion device according to claim 4, wherein the capacity is between about 130 tons and about 450 tons.

6. The electronic expansion device according to claim 1, further comprising a site glass.

7. The electronic expansion device according to claim 1, further comprising a flow indicator.

8. The electronic expansion device according to claim 1, wherein the flow path is curved.

9. The electronic expansion device according to claim 1, wherein the angle is at or about 90°.

10. A heating, ventilation, air conditioning, and refrigeration (HVACR) system, comprising:
a heat transfer circuit, including:
a compressor, a condenser, an electronic expansion device, and an evaporator,
wherein the electronic expansion device includes:
a main body having an inlet side face and an outlet side face;
an inlet disposed on the inlet side face;
an orifice formed in the main body between the inlet side face and the outlet side face, the orifice having an inlet side and an outlet side;
a flow path extending from the inlet side of the orifice to the outlet side of the orifice, the flow path configured to redirect an inlet flow and provide an outlet flow;
an outlet disposed on the outlet side face, the outlet being in fluid communication with the inlet via the orifice and the flow path;
wherein the flow path is configured to receive the inlet flow from the inlet, the inlet flow is divided into a plurality of flow paths around a flow director, and the flow path is rejoined downstream of the flow director to provide the outlet flow from the outlet;
a plurality of flow control devices each including an electric motor and a sealing member, each sealing member extending through the main body between the inlet and the outlet, wherein each sealing member is movable into and out of the main body to control the outlet flow of a fluid, each sealing member being movable toward the flow director to reduce the outlet flow and movable away from the flow director to increase the outlet flow, each sealing member is spaced from the flow director to allow the flow path around a periphery of the flow director, the flow path is configured to redirect the inlet flow away from a longitudinal direction along a space between each sealing member and the flow director, and then converge the inlet flow to provide the outlet flow in the longitudinal direction; and a plurality of flow control device mounts in the main body that are spaced circumferentially around the orifice such that a distance between the plurality of flow control device mounts corresponds to an arc length between the plurality of flow control device mounts, each flow control device mount of the plurality of flow control device mounts having a longitudinal axis, each longitudinal axis being arranged at an angle relative to the other longitudinal axes along a respective radius of the orifice, the plurality of flow control device mounts configured to receive the plurality of flow control devices.

11. The HVACR system according to claim 10, wherein the inlet side face is a circular plane surface of the main body and the outlet side face is a circular plane surface of the main body.

12. The HVACR system according to claim 11, wherein the plurality of flow control devices extend through a curved surface of the main body.

13. The HVACR system according to claim 10, wherein the electronic expansion device has a capacity between about 130 tons and about 1,000 tons.

14. The HVACR system according to claim 13, wherein the capacity is between about 130 tons and about 450 tons.

15. The HVACR system according to claim 10, further comprising a site glass.

16. The HVACR system according to claim 10, further comprising a flow indicator.

17. The HVACR system according to claim 10, wherein the flow path is curved.

18. The HVACR system according to claim 10, wherein the angle is at or about 90°.

19. A method of retrofitting an electronic expansion device into a heating, ventilation, air conditioning, and refrigeration (HVACR) system, the method comprising:

removing an expansion device from the HVACR system; and installing the electronic expansion device in place of the removed expansion device, wherein the electronic expansion device includes a main body having an inlet side face and an outlet side face, an inlet disposed on the inlet side face, an orifice formed in the main body between the inlet side face and the outlet side face and having an inlet side and an outlet side, a flow path extending from the inlet side of the orifice to the outlet side of the orifice, the flow path configured to receive an inlet flow and provide an outlet flow, an outlet disposed on the outlet side face, the outlet being in fluid communication with the inlet via the orifice and the flow path, the flow path configured to receive the inlet flow from the inlet, the inlet flow is divided into a plurality of flow paths around a flow director, and the flow path is rejoined downstream of the flow director to provide the outlet flow from the outlet, a plurality of flow control devices each including an electric motor and a sealing member, each sealing member extending through the main body between the inlet and the outlet, wherein each sealing member is movable into and out of the main body to control the outlet flow of a fluid, each sealing member being movable toward the flow director to reduce the outlet flow and movable away from the flow director to increase the outlet flow, each sealing member is spaced from the flow director to allow the flow path around a periphery of the flow director, the flow path is configured to redirect the inlet flow away from a longitudinal direction along a space between each sealing member and the flow director, and then converge the inlet flow to provide the outlet flow in the longitudinal direction, and a plurality of flow control device mounts in the main body that are spaced circumferentially around the orifice such that a distance between the plurality of flow control device mounts corresponds to an arc length between the plurality of flow control device mounts, each flow control device mount of the plurality of flow control device mounts having a longitudinal axis, each longitudinal axis being arranged at an angle relative to the other longitudinal axes along a respective radius of the orifice, the plurality of flow control device mounts configured to receive the plurality of flow control devices.

20. The method according to claim 19, wherein the angle is at or about 90°.

* * * * *